Aug. 31, 1954  F. W. LIVERMONT  2,687,642
TENSION GAUGE
Filed Aug. 13, 1951  3 Sheets-Sheet 1
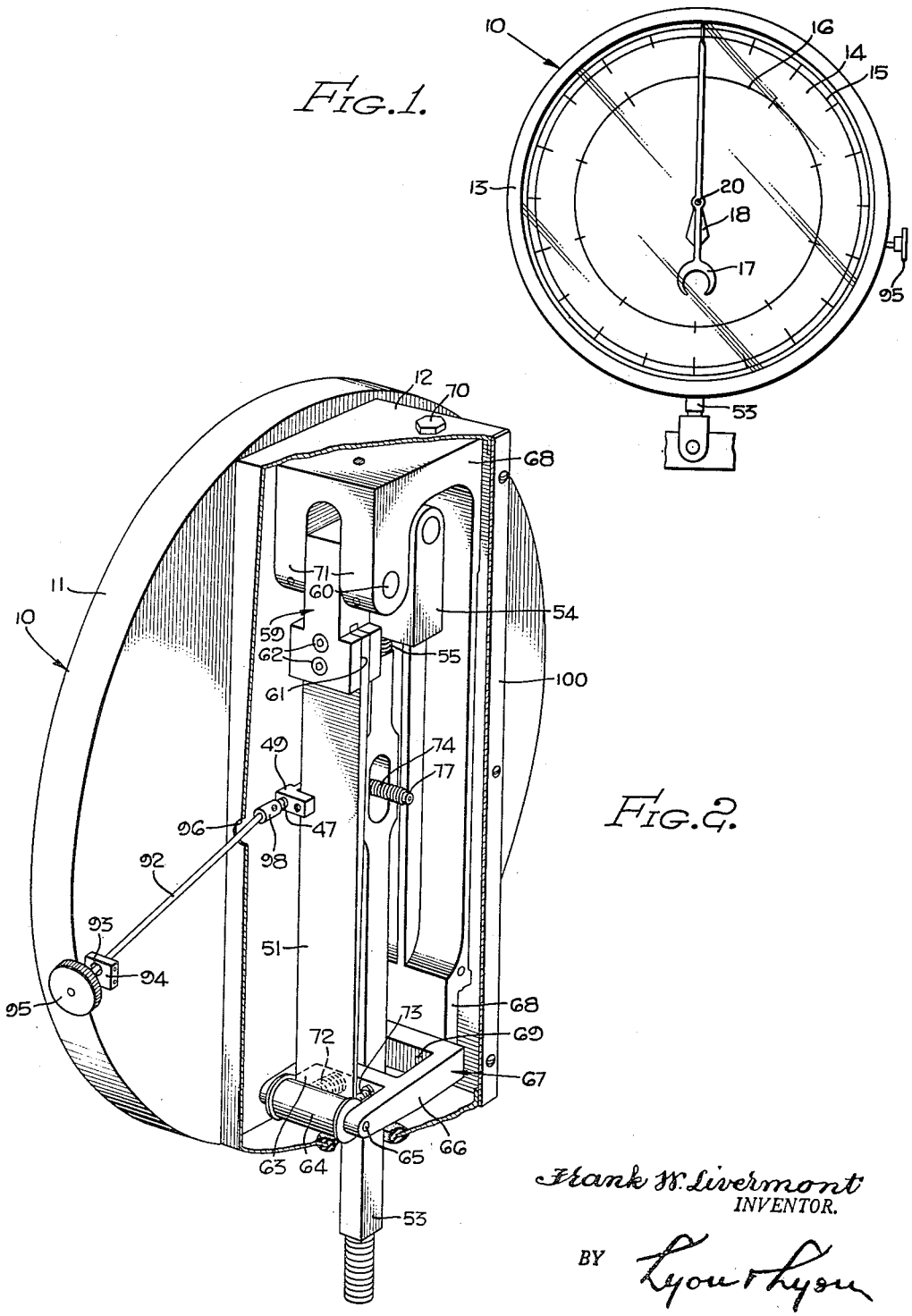
Frank W. Livermont
INVENTOR.
BY Lyon & Lyon
Attorneys Aug. 31, 1954  F. W. LIVERMONT  2,687,642
TENSION GAUGE
Filed Aug. 13, 1951
3 Sheets-Sheet 2
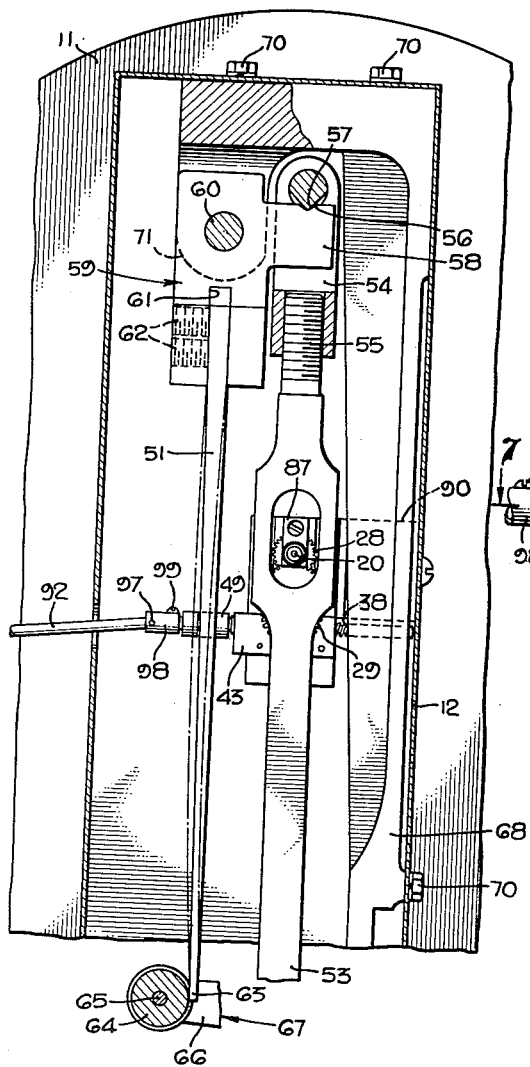
Fig. 3.
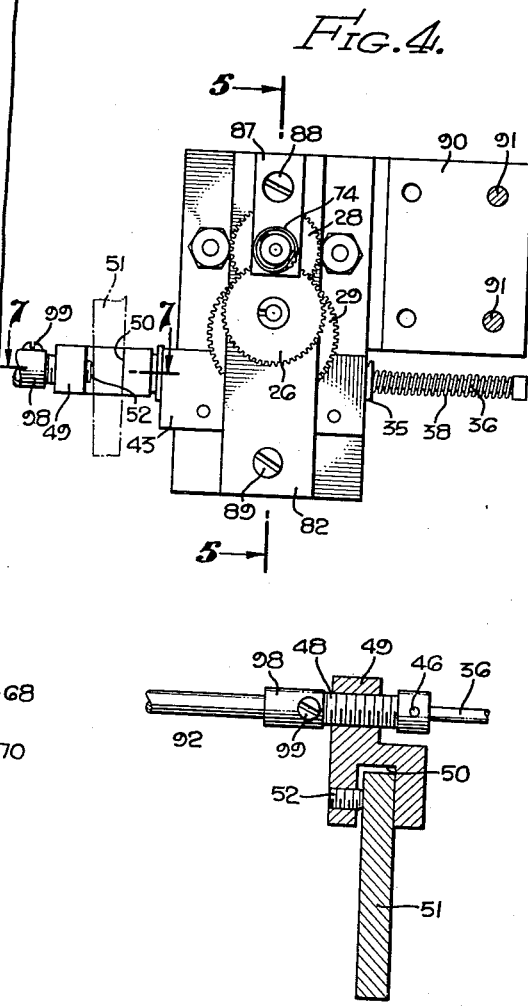
Fig. 4.
Fig. 7.
Frank W. Livermont
INVENTOR.
BY Lyon & Lyon
attorneys Aug. 31, 1954   F. W. LIVERMONT   2,687,642
TENSION GAUGE
Filed Aug. 13, 1951
3 Sheets-Sheet 3
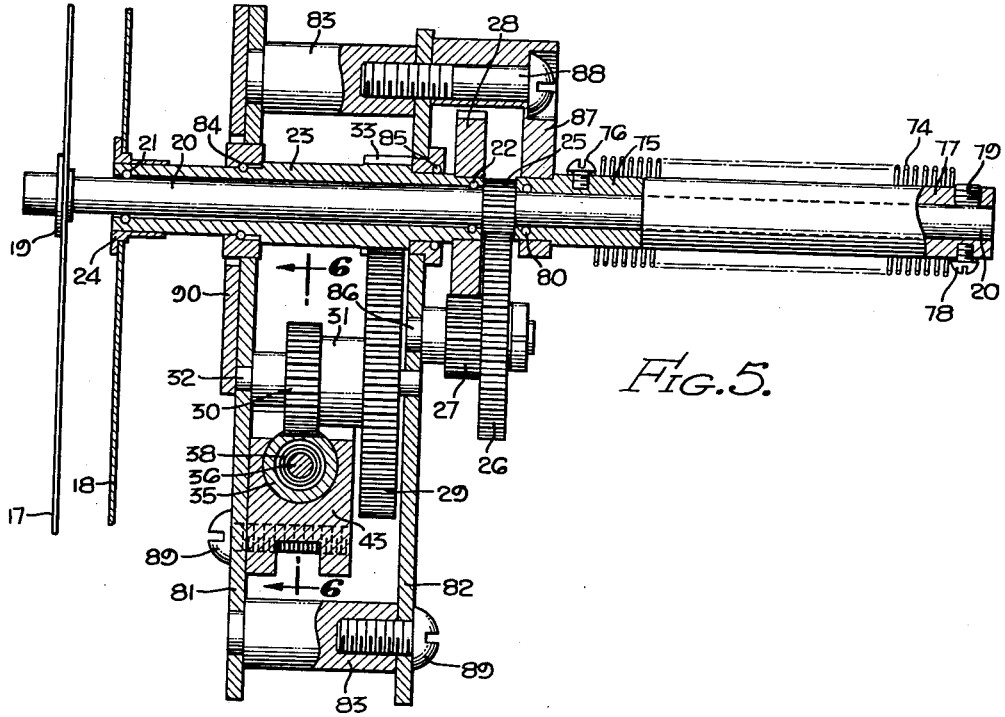
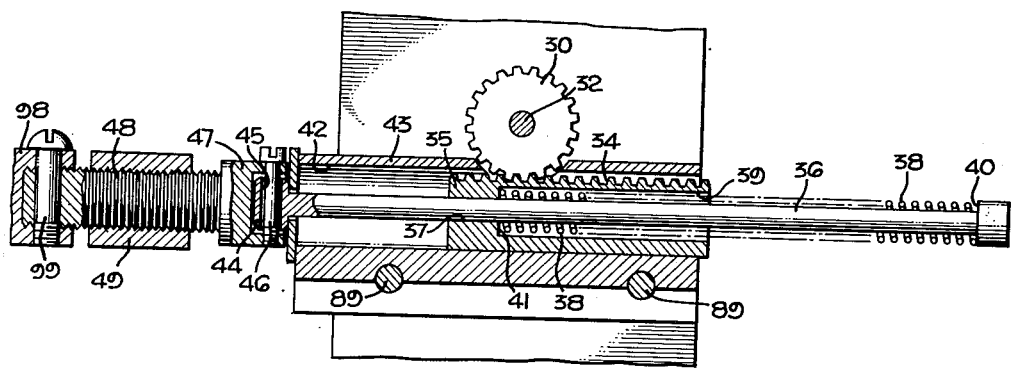
Frank W. Livermont
INVENTOR.
BY Lyon & Lyon
Attorneys Patented Aug. 31, 1954

2,687,642

UNITED STATES PATENT OFFICE 2,687,642

TENSION GAUGE

Frank W. Livermont, Duarte, Calif., assignor to Richmont, Inc., Los Angeles, Calif., a corporation of California Application August 13, 1951, Serial No. 241,681

7 Claims. (Cl. 73—141)

This invention relates to gage mechanisms and is particularly directed to improvements in a tension gage mechanism for use with measuring, testing or calibrating apparatus. This invention finds particular usefulness in connection with gages of this type which are subjected to shock loads, rapidly applied loads and loads of widely varying magnitude.

The gage mechanism disclosed herein is particularly adapted for use with the Torque Analyzer shown in my copending application Serial No. 241,600, filed August 13, 1951. The usefulness of the present invention is not, however, limited to that particular application but to gage mechanisms generally.

It is the principal object of the present invention to provide an indicating gage mechanism for accurately measuring widely varying loads applied to a pull bar and which is provided with shock mounted parts for cushioning the load applied to the gage mechanism.

Another object is to provide a device of this type having spring means for returning the indicating hand or hands toward zero position upon relaxation of the load to be measured.

Other and more detailed objects and advantages will appear hereinafter.

A preferred embodiment of my invention is shown in the accompanying drawings in which:

Figure 1 is a front elevation of a gage mechanism embodying my invention, the indicating hands being positioned at zero.

Figure 2 is a perspective view partly broken away showing the principal operating parts of the gage mechanism.

Figure 3 is a rear elevation, partly in section and partly broken away, showing the relationships of the pull bar and deflection beam within the case.

Figure 4 is an elevation showing the gear train and associated parts.

Figure 5 is a sectional elevation taken substantially on the lines 5—5 as shown in Figure 4.

Figure 6 is a sectional detail taken substantially on the line 6—6 as shown in Figure 5.

Figure 7 is a fragmentary sectional view taken substantially on line 7—7 as shown in Figure 4.

Referring to the drawings, the gage mechanism generally designated 10, may be provided with a stationary circular shell 11 having a rectangular housing 12 secured to its rear surface. A cover 13 having a transparent center portion may be removably mounted on the shell 11. The inner surface of the shell 11 may carry a dial face 14 having suitable indicia thereon. The face may be provided with an outer scale 15 and a concentric inner scale 16. Coaxially mounted hands or pointers 17 and 18 may be provided to sweep the face of the dial 14. The hand 17 is intended for cooperation with the outer scale 15 while the inner hand 18 is intended for cooperation with the inner scale 16.

The hand or pointer 17 is frictionally mounted by means of a sleeve 19 on the projecting end of a pointer shaft 20 which is mounted at the center of the dial face 14. As shown in Figure 5, the shaft 20 is rotatably mounted in axially spaced bearings 21 and 22 carried at the ends of a rotary quill 23. The pointer 18 is secured to the projecting end of the quill 23 by means of a friction sleeve 24. A pinion gear 25 fixed on the pointer shaft 20 meshes with a gear 26 which is connected to turn with the pinion gear 27. The gear 28 fixed on the quill 23 meshes with the gear 27. From this description it will be understood that the pointer shaft 20 and the quill 23 are connected for dependent rotation through the gear train 25, 26, 27 and 28. Any suitable or desired gear ratio may be chosen; in the particular device shown in the drawings the pointer shaft 20 makes ten revolutions for one revolution of the quill 23.

A drive gear 29 and a driven gear 30 are fixed on a sleeve 31 which turns freely on shaft 32. The driving gear 29 meshes with a driven gear 33 fixed on the quill 23 and the driven gear 30 meshes with rack teeth 34 provided on the sleeve 35. A rod 36 extends axially through the sleeve 35 and is slidably received within the bore 37. A coiled spring 38 encircles a portion of the rod 36 and extends into the counterbore 39 provided on the sleeve 35. One end of the spring 38 bears against the shoulder 40 at the end of the rod 36 and the other end of the spring 38 bears against the abutment 41 at the bottom of the counterbore 39.

The sleeve 35 is mounted to slide axially within the bore 42 on the stationary housing 43. The forward end of the rod 36 is enlarged as shown at 44 and provided with a transverse aperture 45 to receive the clevis pin 46. This pin 46 is secured to the clevis 47 which is provided with an externally threaded portion 48. A clamp member 49 is internally threaded to receive the threads 48 on the clevis 47. As best shown in Figure 7, the clamp 49 is provided with a groove 50 which receives one edge of the tapered deflection beam 51. A set screw 52 is provided for clamping the deflection beam 51 to the clamp 49.

Means are provided for causing lateral deflection of the beam 51 in accordance with the magnitude of the tension load applied to the pull bar 53. As shown in the drawings, this means includes a force transmitting element 54 connected to the upper end of the pull bar 53 by means of threads 55. The edge 56 of the element 54 rests in a groove 57 provided on the lateral extending foot 58 of the beam support member 59. This member 59 is mounted for pivotal movement about a stationary supporting pin 60. A groove 61 provided in the member 59 receives the upper end of the tapered deflection beam 51 and set screws 62 serve to hold the beam 51 in place. When a downward force is applied to the pull bar 53, as viewed in Figure 3, the member 59 is caused to swing in a clockwise direction about its supporting pivot 60 and to cause the beam 51 to deflect laterally to the left, as shown by the phantom lines. The lower end 63 of the deflection beam 51 is prevented from moving toward the left by means of an abutment roller 64 carried on a pin 65. The pin 65 extends between the arms 66 of the stationary bracket 67. The bracket 67 is fixed to the lower end of the base member 68 by any suitable attachment fitting 69. The base member 68 is fixed to the housing 12 by means of threaded attachment fittings 70. The upper end of the base member 68 is provided with a pair of downwardly extending ears 71 which carry the pivot pin 60. As shown clearly in Figure 2, the beam support member 59 has its upper portion positioned between the downwardly extending ears 71.

A spring 72 may be provided to hold the lower end 63 of the deflection beam in contact with the roller 64. Furthermore, one or more adjustable limit stops 73 may be provided to limit movement of the lower end 63 of the deflection beam 51 in a direction to compress the spring 72.

When a tension load is applied to the pull bar 53, the beam 51 is caused to deflect, as described above, and this deflection or lateral movement carries the clamp 49 and rod 36 with it. This causes the compression spring 38 to move the sleeve 35 to the left as viewed in Figure 6. This motion is communicated through the gear train 34, 30, 29 and 33, to rotate the quill 23 and its indicating hand or pointer 18. At the same time the gear train 25, 26, 27 and 28, turns the pointer 17 at a slower rate. When the tension load is released from the pull bar 53, the deflection beam 51 is returned to its initial position by the resilience of the beam 51. The gear train connecting the sleeve 35 with the quill 23 is not positively driven in the reverse direction, however, because the sleeve 35 is slidably mounted on the rod 36. In order to avoid objectionable lag in the positioning of the pointers 17 and 18, therefore, I provide a torsion spring 74 which acts directly on the pointer shaft 20 and need not act through the gear train 34, 30, 29 and 33. The torsion spring 74 has one end fixed to the stationary tube 75 by means of screw 76. The other end of the torsion spring 74 is connected to the rotary sleeve 77 by means of the screw 78. A set screw 79 fixes the rotary sleeve 77 to the pointer shaft 20. The torsion spring 74 is wound in a direction which applies a torque to the pointer shaft in a direction to return the pointers 17 and 18 to zero on the dial face 14. A bearing 80 for the pointer shaft 20 may be provided within the stationary tube 75.

The gearing and associated parts of the gage mechanism may be supported on parallel plates 81 and 82 connected by suitable spacers 83. These plates support the outer races for the quill bearings 84 and 85 and these plates also support the shaft 32 and the stationary stub shaft 86 which supports the gears 26 and 27. The stationary tube 75 is fixed on an L-shaped bracket 87 which is fixed to one of the spacers 83 by means of a machine screw 88. The plate 81 also supports the housing 43 by means of the threaded attachment fittings 89. A mounting bracket 90 is attached to the plate 81. This bracket is secured to the stationary case 12 by means of suitable threaded connections 91.

Means are provided for adjusting the initial position of the pointers 17 and 18 so that they point to zero when the load is released from the pull bar 53. As shown in the drawings, this adjustment means includes a shaft 92 which passes through an opening 93 in a stationary lug 94 fixed to the shell 11. A manually graspable knob 95 is fixed to the outer end of the shaft 92. The shaft 92 extends through an aperture 96 provided in the housing 12 and is connected by means of a transverse pin 97 to a collar 98. The collar 98 is fixed by means of pin 99 to the projecting end of the threaded portion 48 of the clevis 47. From this description it will be understood that turning of the knob 95 serves to rotate the clevis 47 with respect to the clamp 49 and thereby cause the clevis to move axially with respect to the clamp. Such axial movement is communicated through the rod 36 and spring 38 to the sleeve 35 and then through the gear train to the pointers 17 and 18. Cover plate 100 may be removably attached to the housing 12 to complete an enclosure for the gage mechanism.

In operation, the gage device 10 is preferably mounted upright with the pull bar 53 in a vertical position. The gage housing 12 is fixed by any suitable means to prevent movement when a tension load is applied to the pull bar 53. The knob 95 is turned to bring the pointers 17 and 18 both to zero position with respect to the gage dial 14 before the load is applied to the pull bar 53.

Application of a tension load to the pull bar 53 deflects the beam 51 and causes lateral movement of the clevis 47 and rod 36. If the tension load should be suddenly applied or suddenly released, no damage is caused to the gear train or other parts of the gage mechanism because the force is applied to the gear train through the compression spring 38. Sudden release of the load on the pull bar 53 is accompanied by rapid return of the hands 17 and 18 toward initial zero position under power supplied directly from the coil spring 74. The pointers 17 and 18, therefore, respond quickly to a decrease in applied load. Moreover the compression spring 38 is made stiff enough to drive the pointers 17 and 18 rapidly in the direction of increasing load and yet serves to cushion the gear train and associated mechanism against damage from violent shocks. The gage device is, therefore, particularly well suited for handling shock loads in either direction while retaining a high degree of sensitivity.

Having fully described my invention, it is to be understood that I do not wish to be limited to the details herein set forth, but my invention is of the full scope of the appended claims.

I claim:

1. In a gage mechanism for measuring the tension applied to a pull bar, the combination of: a beam, a stationary frame supporting the beam, linkage means for deflecting the beam laterally in proportion to a tension load applied to the pull bar, a rod element, means for connecting the rod element to the said beam whereby lateral deflection of the beam serves to move the rod element axially, an indicator mounted on the frame for turning movement, a gear train on the frame connected to turn said indicator, said gear train including a rack slidably mounted relative to said rod element, means interconnecting said rack and rod to move said rack and turn said gear train upon movement of said rod in accordance with deflection of the beam under increasing load, and a torsion spring operatively connected to rotate the indicator in a direction corresponding to decreasing load.

2. In a gage mechanism for measuring the tension applied to a pull bar, the combination of: a beam, a stationary frame supporting the beam, linkage means for deflecting the beam laterally in proportion to a tension load applied to the pull bar, a rod element, means for connecting the rod element to the said beam whereby lateral deflection of the beam serves to move the rod axially, an indicator mounted on the frame for turning movement, a gear train on the frame connected to turn said indicator, said gear train including a rack slidably mounted relative to said rod element, a spring operatively interposed between the rod element and said rack for moving said rack and turning the gear train in accordance with deflection of the beam under increasing load, and a torsion spring operatively connected to rotate the indicator in a direction corresponding to decreasing load.

3. In a gage mechanism having a beam deflected laterally in proportion to a tension load applied to a pull bar, the combination of: a rod element, means for pivotally connecting the rod element to the said beam, an indicator mounted for turning movement, a gear train connected to turn said indicator, the gear train including a rack slidably mounted relative to the rod element and provided with a recess, a compression spring encircling the rod element and extending into said recess for turning the gear train in accordance with deflection of the beam under increasing load, and a torsion spring operatively connected to rotate the indicator in a direction corresponding to decreasing load.

4. In a gage mechanism having a beam deflected laterally in proportion to a tension load applied to a pull bar, the combination of: an axially movable rod element, means for connecting the rod element to the said beam whereby lateral deflection of the beam serves to move the rod axially, an indicator mounted for turning movement with respect to said beam, a gear train connected to turn said indicator, the gear train including a rack slidably mounted relative to the rod element and provided with a recess, a compression spring encircling the rod and extending into the recess for turning the gear train in accordance with deflection of the beam under increasing load, and a torsion spring operatively connected to rotate the indicator in a direction corresponding to decreasing load.

5. In a gage, the combination of: a stationary frame, a support pivotally mouted on said frame and having a laterally extending foot, a pull bar, means on the pull bar engaging the foot to apply a torque load to said support, a beam having one end secured to said support, means engaging the other end of the beam for limiting movement thereof, a rod, clamp means connecting the rod to the beam intermediate its ends whereby lateral deflection of the beam under bending load applied by the support serves to move the rod, an element slidably mounted with respect to the frame, a spring operatively interposed between the rod and said element for moving the element in a direction corresponding to increasing load, a gear rack on said element, an indicator mounted for turning movement with respect to the frame, gear means driven by the rack and operatively connected to turn said indicator, and a torsion spring positioned coaxially of the rotary axis of the indicator and acting to turn the indicator in a direction corresponding to decreasing load.

6. In a gage, the combination of: a stationary frame, a support pivotally mounted on said frame and having a laterally extending foot, an upright pull bar, means on the pull bar engaging the foot to apply a torque load to said support, a beam having one end secured to said support, means engaging the other end of the beam for limiting movement thereof, an axially movable rod, clamp means adjustably connecting the rod to the beam intermediate its ends whereby lateral deflection of the beam under bending load applied by the support serves to move the rod laterally, an element slidably mounted with respect to the frame and positioned coaxially of the rod, a compression spring operatively interposed between the rod and said element for moving the element in a direction corresponding to increasing load, a gear rack on said element, an indicator mounted for turning movement with respect to the frame, gear means driven by the rack and operatively connected to turn said indicator, a torsion spring positioned coaxially of the rotary axis of the indicator and acting to turn the indicator in a direction corresponding to decreasing load.

7. In a gage, the combination of: a stationary frame, a support pivotally mounted on said frame and having a laterally extending foot, a pull bar, means on the pull bar engaging the foot to apply a torque load to said support, a beam having one end secured to said support, means engaging the other end of the beam for limiting movement thereof, a rod, clamp means connecting the rod to the beam intermediate its ends whereby lateral deflection of the beam under bending load applied by the support serves to move the rod, an element slidably mounted with respect to the frame, a spring operatively interposed between the rod and said element for moving the element in a direction corresponding to increasing load, a gear rack on said element, a pair of indicators mounted for turning movement with respect to the frame about a common axis, gear means operatively connecting the indicators so that one turns faster than the other, gear means driven by the rack and operatively connected to turn the slower moving indicator, a torsion spring positioned coaxially of the common rotary axis of the indicators and acting to turn the faster moving indicator in a direction corresponding to decreasing load.

References Cited in the file of this patent

UNITED STATES PATENTS

| Number | Name | Date |
| --- | --- | --- |
| 342,550 | Ward | May 25, 1886 |
| 1,617,485 | Hughes | Feb. 15, 1927 |
| 2,287,299 | Dillon | June 23, 1942 |
| 2,524,602 | Rosenberger | Oct. 3, 1950 |
| 2,527,173 | Boat | Oct. 24, 1950 |
| 2,540,176 | Saunders | Feb. 6, 1951 |
| 2,579,444 | Taylor | Dec. 18, 1951 |